Aug. 4, 1964     H. F. McCARTHY ETAL     3,143,114
SURGICAL APPLIANCE
Filed Dec. 2, 1960
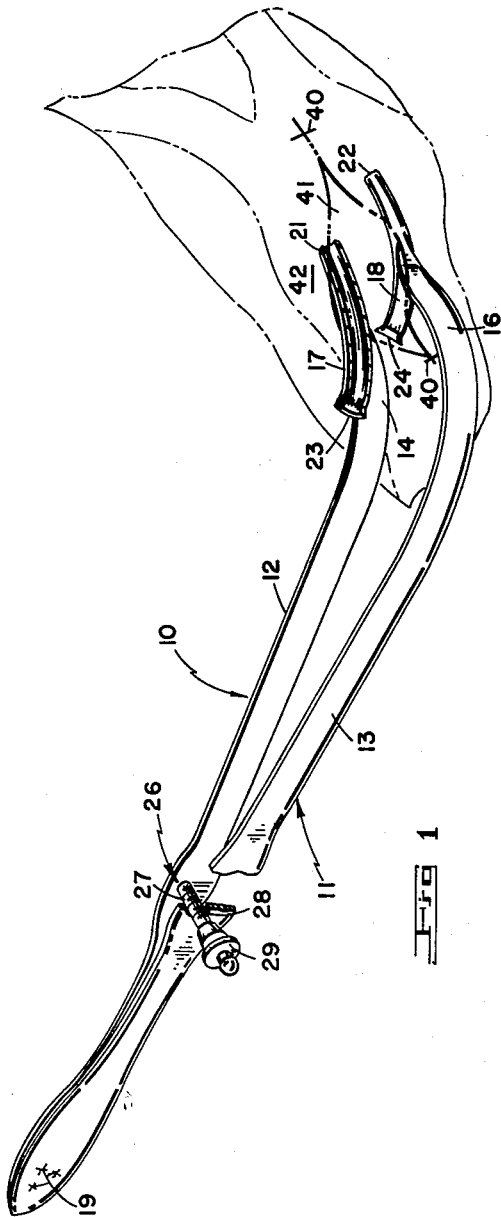
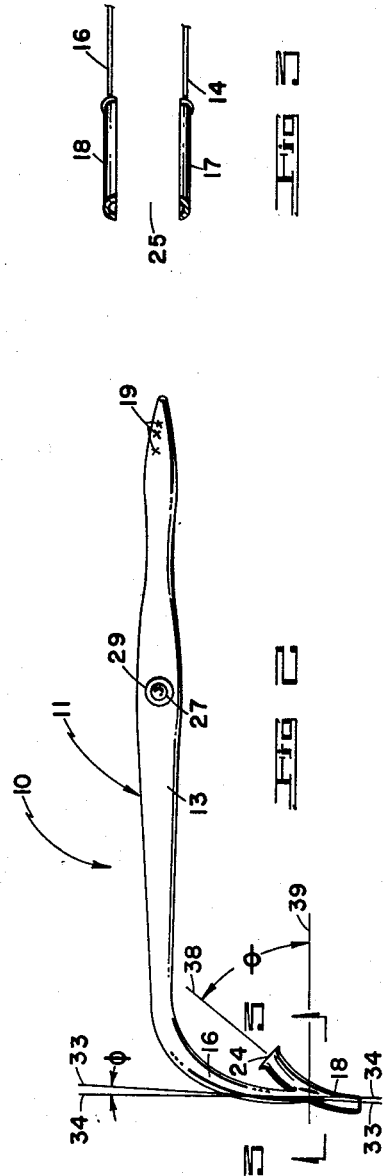
HORACE FRANK McCARTHY
MAURICE H. SUBILIA
            INVENTORS
BY *Alden D Redfield*
   *Abraham Ogman*
            ATTORNEYS

United States Patent Office 3,143,114
Patented Aug. 4, 1964

3,143,114
SURGICAL APPLIANCE
Horace Frank McCarthy, North Andover, Mass., and Maurice H. Subilia, Salem Depot, N.H., assignors to Avco Corporation, Cincinnati, Ohio, a corporation of Delaware
Filed Dec. 2, 1960, Ser. No. 73,373
4 Claims. (Cl. 128—303)

This invention relates, generally, to surgical appliances and, in particular, to an appliance finding special application in surgical procedures requiring the intubation and/or cleansing of a duct in the human body.

For purposes of illustration, this discussion will be directed to the use of the surgical appliance in connection with the so-called "common duct" joining the hepatic ducts and the cystic duct to the duodenum.

Frequently, it is required to explore the interior of the common duct. These explorations are made when the duct becomes dilated or the walls thicken for any reason. They are also made when there is evidence of calcium deposits, or stones, in the duct or gall bladder.

Additionally, when sediment is observed in the bile passed by the duct it is recommended that the interior thereof be examined.

Additionally, particularly in the case of stricture, it is often required to open up the common duct to remove or repair the cause of the stricture to assure the free passage of bile and other body fluids through the duct.

In order to accomplish any of the foregoing objectives, an incision is required in the wall of the common duct. Access to the duct is through the abdominal wall and, typically, the surgeon is required to operate in an area, adjacent to the common duct, of less than ten square inches. Manifestly, access through the abdominal wall into the common duct is limited.

The common duct is exposed by means of manual or mechanical retractors which assert a lateral force on tissues adjacent to the common duct. The common duct is elusive and extremely difficult to immobilize, a necessary precaution in current practice. Immobilization is usually accomplished by means of instruments or sutures. Ancillary means is also required to support the walls of the common duct to prevent rupturing these walls or severing the duct. In practice today the operating surgeon requires an assistant in constant attendance. In other words, at least two pairs of hands are almost constantly required in the very restricted operational area adjacent to the common duct.

As far as it has been determined there does not exist, in the prior art, an appliance which takes into consideration the foregoing problems relating to a common duct operational procedure. The present invention recognizes the need for greatly facilitating the handling of the common duct, the need for providing adequate support for the walls thereof in a simple and facile manner, and the need for obviating the use of manual and/or mechanical means for holding the duct open.

It is an object of the invention to provide a surgical appliance which will perform effectively, efficiently, and with relative ease, the functions of holding the mouth of an incision open, safely support the fragile wall structure of ducts within the human body, and facilitate the insertion of probing instruments, catheters, and T-tubes, within these ducts.

It is another object of the invention to provide a surgical appliance which is operated from a position remote from the region in which a surgeon is performing a surgical procedure.

It is still another object of the invention to provide a surgical appliance, operable in tweezer-like fashion, and includes means for faciliating the insertion of catheters, T-tubes, and probes into a duct.

It is yet another object of the invention to provide a surgical appliance which includes a sleeve construction at the operating, or free end, which sleeve acts to facilitate the insertion of catheters, T-tubes, and probes into a human duct.

It is yet another object of the invention to provide a surgical appliance particularly suited for use in connection with the common duct.

It is yet another object of the invention to provide a surgical appliance for use in surgical procedures in connection with human ducts which includes means for adjusting itself to the size of the duct being operated on.

In accordance with the invention, there is provided a surgical appliance which comprises a handle having two arms with laterally curved fingers extending therefrom. Each of the fingers terminates in a bisected cylindrical sleeve portion. The handles are joined at one end so as to resemble and operate like a pair of tweezers to bring the sleeve portions together or to a predetermined separation. The surgical appliance also includes means for maintaining the sleeve portions at any predetermined separation.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings in which:

FIGURE 1 is a perspective representation of a surgical appliance embodying the principles of the present invention, in an operating position;

FIGURE 2 is a side view of the FIGURE 1 appliance; and

FIGURE 3 is a cross sectional representation taken along line 3—3 in FIGURE 2.

Referring to FIGURE 1 of the drawing, there is shown a surgical appliance 10. The surgical appliance 10 comprises a handle 11 formed from a pair of arms 12 and 13, each of which includes a laterally curved finger 14 and 16, respectively. The fingers 14 and 16 are terminated in sleeve portions 17 and 18 as shown in FIGURE 1.

The arms 12 and 13 are joined at one end by means of spot-welds 19 so that the appliance is operable in a manner similar to a pair of tweezers. It is readily recognized that, like a tweezer, the arms 12 and 13 will tend to maintain a diverging separation unless restrained from doing so.

The sleeve portions 17 and 18 comprise halves of a bisected curved cylinder. Ends 21 and 22 of sleeve portion 17 and 18, respectively, are chamfered to facilitate entry of the sleeve into a duct. Ends 23 and 24, on the other hand, are flared outwardly to facilitate inserting a probe or tube into the compartment 25 formed when the sleeve portions 17 and 18 are brought together. See FIGURE 3.

A screw mechanism 26, comprises a threaded stem 27, anchored in arm 12 and passing through a clearance hole 28 in arm 13, and a nut 29 inserted on the stem 27. The nut 29 is adapted to bear against the arm 13, thus preventing the arms 12 and 13 from returning to their normally separated and unrestrained position. The screw mechanism, as heretofore described, thus provides means for maintaining the sleeve portions 17 and 18 at any desired separation.

As seen in FIGURE 1, the sleeve portions 17 and 18 are secured to the ends of fingers 14 and 16, respectively, at a point intermediate the ends of the sleeves 17 and 18. The forward portions of the sleeve portions 17 and 18 extending outwardly from the fingers 12 and 13, may be colinear or substantially colinear with the fingers as indicated by axes 33 and 34. The axes 33 and 34 are shown separated by an angle φ. The magnitude of this angle is not critical but, for a most efficient appliance, lies between three and four degrees.

Rear portions of the sleeve portions 17 and 18 are seen to curve upwardly toward the handle, particularly as indicated by the angle θ between axes 38 and 39. Preferably, θ is 50°, but this too is not meant to be a critical value.

The manner in which the surgical appliance 10 is to be used is quite obvious from FIGURE 1. However, a brief discussion of a surgical procedure for inserting a permanent tube in the common duct will be described. Initially, it will be assumed that an incision 41, which is generally from one to one and one-half inches long, has been made in the common duct 42. The surgical appliance 10 is inserted by bringing the sleeve portions 17 and 18 firmly together and inserting the ends 21 and 22 thereof into the incision.

Conventionally, the common duct is cleansed of calcium deposits and flushed before a tube is inserted. The cleansing procedure is greatly facilitated by merely releasing the restraining force, holding the sleeve portions 17 and 18 together, and allowing these to separate, as they will do if not restrained by screw mechanism 26. As the sleeve portions 17 and 18 expand, they expand the walls of the common duct and open the mouth of the incision. At a predetermined opening, the screw mechanism once more is manipulated to prevent further expansion or separation. See FIGURE 1. It is well to note that there is no longitudinal growth of the incision 41 since, typically, clamps 40 are placed at the extreme ends of the incision for this purpose.

With the mouth of the incision 41 open and the forward parts of the sleeve portions 17 and 18 inserted in the duct, the interior of the duct is readily available for flushing and for probing instruments. The appliance 10 supports the walls of the common duct in the vicinity of the incision. This last point is particularly important where the walls of the duct were collapsed because of stricture.

After the duct is thoroughly cleansed, the sleeve portions 17 and 18 are brought together again and the tube that is to be permanently inserted within the duct is inserted in ends 23 and 24 and guided through the sleeve into the duct 42. When the tube is in position, the sleeve portions 17 and 18 are separated slightly and removed from the duct 42 leaving the permanent tube in place.

In all surgical procedures relating to the common duct, time is of the utmost importance. The surgical appliance described herein was found to reduce materially the time required for performing an operation on the common duct. The use of the appliance also lessened materially the danger of damage to the common duct by the probing tools and the insertion of catheters or permanent tubes that is frequently experienced in the absence of an instrument of this type.

Though described in connection with the common duct, it is quite obvious that the surgical appliance 10 has great utility in connection with other duct-like structures found throughout the body.

The length of the handle is from 8 to 10 inches. It can be manipulated easily from a position outside of the abdominal cavity, thus eliminating one pair of hands from the highly restricted region in the vicinity of the common duct.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. A surgical appliance comprising:
   (a) a handle including a pair of angularly displaced elongated members secured at one of their ends and curving laterally at the other ends thereof; and
   (b) a bisected sleeve member secured to each of said other ends at an intermediate point defining a front and a rear portion and disposed to co-operate with each other to form a closed cylinder when said other ends are moved toward each other, the forward portion of said sleeve member extending substantially in line with said laterally curved ends, and the rear portion curving from said intermediate point toward said elongated members.

2. A surgical appliance comprising:
   (a) a handle including a pair of angularly displaced elongated members secured at one of their ends and laterally curving portions at the other ends thereof; and
   (b) a bisected sleeve member secured to each of said other ends at an intermediate point defining a front and rear portion and disposed to co-operate with each other to form a closed cylinder when the laterally curving ends are moved toward each other, said front portion being angularly displaced from said laterally curving portion by an angle of about four degrees and said rear portion being angularly displaced toward said elongated members from an axis transverse to said laterally curving ends by an angle of about fifty degrees.

3. A surgical appliance as described in claim 2 in which said laterally curving portions extend at right angles from said elongated members.

4. A surgical appliance as described in claim 3 in which said laterally curving portions are, in addition, co-planar with said elongated members.

References Cited in the file of this patent

UNITED STATES PATENTS

| | | |
|---|---|---|
| 922,845 | Borden | May 25, 1909 |
| 1,450,419 | Heidbrink | Apr. 3, 1923 |

OTHER REFERENCES

"Standard Surgical Instruments" The Kny-Sheerer Corporation of America" Copyright 1891 (5216 pages only FIG. B/-750 page 2025 relied upon).

"Catalogue of Surgical Instruments" Knauth Brothers, New York, Copyright 1891 (139 pages only FIG. 2309 page 64 relied upon).